US007596782B2

(12) United States Patent
Ebbo et al.

(10) Patent No.: US 7,596,782 B2
(45) Date of Patent: Sep. 29, 2009

(54) SOFTWARE BUILD EXTENSIBILITY

(75) Inventors: David S. Ebbo, Redmond, WA (US); Ting-Hao Yang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 10/692,765

(22) Filed: Oct. 24, 2003

(65) Prior Publication Data

US 2005/0091230 A1    Apr. 28, 2005

(51) Int. Cl.
G06F 9/45    (2006.01)
G06F 9/44    (2006.01)

(52) U.S. Cl. .................. 717/141; 717/114; 717/162
(58) Field of Classification Search ............... 717/140
See application file for complete search history.

(56) References Cited

U.S. PATENT DOCUMENTS

| | | | |
|---|---|---|---|
| 3,937,925 A | 2/1976 | Boothroyd |
| 3,956,615 A | 5/1976 | Anderson et al. |
| 4,186,871 A | 2/1980 | Anderson et al. |
| 4,807,154 A | 2/1989 | Scully et al. |
| 4,847,785 A | 7/1989 | Stephens |
| 4,949,300 A | 8/1990 | Christenson et al. |
| 4,979,148 A | 12/1990 | Bush et al. |
| 5,299,315 A | 3/1994 | Chin et al. |
| 5,349,657 A | 9/1994 | Lee |
| 5,388,156 A | 2/1995 | Blackledge, Jr. et al. |
| 5,465,332 A | 11/1995 | Deloye et al. |
| 5,517,655 A | 5/1996 | Collins et al. |
| 5,548,340 A | 8/1996 | Bertram |
| 5,550,560 A | 8/1996 | Kanada et al. |
| 5,604,908 A | 2/1997 | Mortson |
| 5,638,176 A | 6/1997 | Hobbs et al. |

(Continued)

FOREIGN PATENT DOCUMENTS

EP    1156415    11/2001

(Continued)

OTHER PUBLICATIONS

"ASP Configurations Files", Chris Sully, Feb. 2003. Online retrieved at <www.dotnetjohn.com/PrintFriend.aspx?articleid=24>.*

(Continued)

*Primary Examiner*—Tuan Q Dam
*Assistant Examiner*—Thuy Dao
(74) *Attorney, Agent, or Firm*—Merchant & Gould P.C.

(57) ABSTRACT

In a first exemplary media implementation, one or more processor-accessible media include a build provider that is tailored for a particular file type, the build provider adapted to generate code from files corresponding to the particular file type and to contribute the generated code to a compilation. In a second exemplary media implementation, one or more processor-accessible media include processor-executable instructions that, when executed, direct a device to perform actions including: accepting multiple files, each file of the multiple files corresponding to a respective file type and including source code; associating a build provider with each file of the multiple files in accordance with the corresponding respective file type; ascertaining the source code of each file of the multiple files via the associated build provider; and compiling the ascertained source code of each file of the multiple files into an assembly.

12 Claims, 10 Drawing Sheets

U.S. PATENT DOCUMENTS

| | | | |
|---|---|---|---|
| 5,640,449 A | 6/1997 | Worley et al. | |
| 5,664,228 A | 9/1997 | Mital | |
| 5,675,520 A | 10/1997 | Pitt, III et al. | |
| 5,706,505 A | 1/1998 | Fraley et al. | |
| 5,732,256 A | 3/1998 | Smith | |
| 5,732,267 A | 3/1998 | Smith | |
| 5,745,103 A | 4/1998 | Smith | |
| 5,748,890 A | 5/1998 | Goldberg et al. | |
| 5,774,670 A | 6/1998 | Montulli | |
| 5,793,982 A | 8/1998 | Shrader et al. | |
| 5,812,996 A | 9/1998 | Rubin et al. | |
| 5,835,724 A | 11/1998 | Smith | |
| 5,855,020 A | 12/1998 | Kirsch | |
| 5,878,141 A | 3/1999 | Daly et al. | |
| 5,878,282 A | 3/1999 | Mital | |
| 5,897,622 A | 4/1999 | Blinn et al. | |
| 5,911,068 A | 6/1999 | Zimmerman et al. | |
| 5,918,007 A | 6/1999 | Blackledge, Jr. et al. | |
| 5,940,075 A | 8/1999 | Mutschler, III et al. | |
| 5,940,847 A | 8/1999 | Fein et al. | |
| 5,953,524 A | 9/1999 | Meng et al. | |
| 5,956,489 A | 9/1999 | San Andres et al. | |
| 5,961,601 A | 10/1999 | Iyengar | |
| 5,963,952 A | 10/1999 | Smith | |
| 5,983,227 A | 11/1999 | Nazem et al. | |
| 5,991,802 A | 11/1999 | Allard et al. | |
| 6,006,230 A | 12/1999 | Ludwug et al. | |
| 6,014,637 A | 1/2000 | Fell et al. | |
| 6,014,666 A | 1/2000 | Helland et al. | |
| 6,032,207 A | 2/2000 | Wilson | |
| 6,038,551 A | 3/2000 | Barlow et al. | |
| 6,067,578 A | 5/2000 | Zimmerman et al. | |
| 6,072,664 A | 6/2000 | Aoyagi et al. | |
| 6,076,108 A | 6/2000 | Courts et al. | |
| 6,101,607 A | 8/2000 | Bachand et al. | |
| 6,108,717 A | 8/2000 | Kimura et al. | |
| 6,115,744 A | 9/2000 | Robins | |
| 6,121,968 A | 9/2000 | Arcuri et al. | |
| 6,138,150 A | 10/2000 | Nichols et al. | |
| 6,167,524 A | 12/2000 | Goodnow et al. | |
| 6,178,461 B1 | 1/2001 | Chan et al. | |
| 6,185,608 B1 | 2/2001 | Hon et al. | |
| 6,203,220 B1 | 3/2001 | Takenoshita et al. | |
| 6,205,480 B1 | 3/2001 | Broadhurst et al. | |
| 6,212,192 B1 | 4/2001 | Mirashrafi et al. | |
| 6,218,958 B1 | 4/2001 | Eichstaedt et al. | |
| 6,230,160 B1 | 5/2001 | Chan et al. | |
| 6,246,422 B1 | 6/2001 | Emberling et al. | |
| 6,247,044 B1 | 6/2001 | Gosling et al. | |
| 6,253,228 B1 | 6/2001 | Ferris et al. | |
| 6,253,234 B1 | 6/2001 | Hunt et al. | |
| 6,279,151 B1 | 8/2001 | Breslau et al. | |
| 6,286,133 B1 | 9/2001 | Hopkins | |
| 6,326,957 B1 | 12/2001 | Nathan et al. | |
| 6,334,157 B1 | 12/2001 | Oppermann et al. | |
| 6,343,148 B2 | 1/2002 | Nagy | |
| 6,351,767 B1 | 2/2002 | Batchelder et al. | |
| 6,353,447 B1 | 3/2002 | Truluck et al. | |
| 6,354,477 B1 | 3/2002 | Trummer | |
| 6,363,352 B1 | 3/2002 | Dailey et al. | |
| 6,370,561 B1 | 4/2002 | Allard et al. | |
| 6,373,841 B1 | 4/2002 | Goh et al. | |
| 6,389,590 B1 * | 5/2002 | Miller et al. | 717/140 |
| 6,397,253 B1 | 5/2002 | Quinlan et al. | |
| 6,401,099 B1 | 6/2002 | Koppulu et al. | |
| 6,405,241 B2 | 6/2002 | Gosling et al. | |
| 6,412,008 B1 | 6/2002 | Fields et al. | |
| 6,430,575 B1 | 8/2002 | Dourish et al. | |
| 6,460,071 B1 | 10/2002 | Hoffman | |
| 6,460,141 B1 | 10/2002 | Olden | |
| 6,463,442 B1 | 10/2002 | Bent et al. | |
| 6,480,894 B1 | 11/2002 | Courts et al. | |
| 6,487,665 B1 | 11/2002 | Andrews et al. | |
| 6,505,238 B1 | 1/2003 | Tran | |
| 6,546,516 B1 | 4/2003 | Wright et al. | |
| 6,557,038 B1 | 4/2003 | Becker et al. | |
| 6,560,598 B2 | 5/2003 | Delo et al. | |
| 6,560,618 B1 | 5/2003 | Ims | |
| 6,560,774 B1 * | 5/2003 | Gordon et al. | 717/146 |
| 6,564,251 B2 | 5/2003 | Katariya et al. | |
| 6,591,272 B1 | 7/2003 | Williams | |
| 6,606,418 B2 | 8/2003 | Mitchell et al. | |
| 6,622,168 B1 | 9/2003 | Datta | |
| 6,633,416 B1 | 10/2003 | Benson | |
| 6,725,219 B2 | 4/2004 | Nelson et al. | |
| 6,728,421 B2 | 4/2004 | Kokemohr | |
| 6,922,827 B2 * | 7/2005 | Vasilik et al. | 717/140 |
| 2001/0054020 A1 | 12/2001 | Barth et al. | |
| 2002/0004815 A1 | 1/2002 | Muhlestein et al. | |
| 2002/0008703 A1 | 1/2002 | Merrill et al. | |
| 2002/0083171 A1 | 6/2002 | Hoogenboom et al. | |
| 2002/0108102 A1 | 8/2002 | Muhlestein et al. | |
| 2002/0188890 A1 | 12/2002 | Shupps et al. | |
| 2003/0009476 A1 | 1/2003 | Fomenko et al. | |
| 2003/0009519 A1 | 1/2003 | Gosling et al. | |
| 2003/0009567 A1 | 1/2003 | Farouk | |
| 2003/0018827 A1 | 1/2003 | Gutherie et al. | |
| 2003/0025728 A1 | 2/2003 | Ebbo et al. | |
| 2003/0028565 A1 | 2/2003 | Landsman et al. | |
| 2003/0066056 A1 * | 4/2003 | Petersen et al. | 717/137 |
| 2003/0074634 A1 | 4/2003 | Emmelmann | |
| 2003/0097639 A1 | 5/2003 | Niyogi et al. | |
| 2004/0003112 A1 | 1/2004 | Alles et al. | |
| 2004/0003139 A1 | 1/2004 | Cottrille et al. | |
| 2004/0003248 A1 | 1/2004 | Arkhipov | |
| 2004/0073873 A1 | 4/2004 | Croney et al. | |
| 2004/0230958 A1 * | 11/2004 | Alaluf | 717/140 |

FOREIGN PATENT DOCUMENTS

| | | |
|---|---|---|
| EP | 1156427 | 11/2001 |
| EP | 1156428 | 11/2001 |
| EP | 1164473 | 12/2001 |
| EP | 01111680.3-2201- | 4/2002 |
| EP | 01111681.1-2201- | 4/2002 |
| WO | WO 98/21651 | 5/1998 |
| WO | WO 98/44695 | 10/1998 |
| WO | WO 99/34288 | 7/1999 |

OTHER PUBLICATIONS

"Special Edition Using Microsoft ASP.NET" to Leinecker, Mar. 2002. Online retrieved at <http://proquest.safaribooksonline.com>.*

"Transforming the .NET intermediate language using path logic programming", Drape et al., Dec. 2002, pp. 133-144. Online retrieved at <http://delivery.acm.org/10.1145/580000/571171/p133-drape.pdf>.*

"Typing a multi-language intermediate code", Gordon et al., Dec. 2001, pp. 248-260. Online retrieved at <http://delivery.acm.org/10.1145/370000/360228/p248-gordon.pdf>.*

Dowd, Tyson et al., "Compiling Mercury to the .NET Common Language Runtime," Electronic Notes in Theoretical Computer Science 59 No. 1 (Netherlands) (2001), pp. 1-16.

Sells, Chris et al., "Generating Code at Run Time With Reflection. Emit," Windows Developer Magazine, Aug. 2002, vol. 13, No. 8, pp. 26-34.

Hannay, Philip et al., "MSIL for the .NET Framework: The Next Battleground?", Virus Bulletin Conference, Sep. 2001, pp. 173-196.

Syme, Don, "ILX: Extending the .Net Common IL for Functional Language Interoperability," Electronic Notes in Theoretical Computer Science 59 No. 1 (2001), pp. 1-20.

"A Brief History of Hypertext", from Microsoft Corporation © 1996.

"Alterego Networks Introduces First Mobile Web Server for Enterprises, Telcos and Providers"; Redwood City, CA; Nov. 14, 2000; 3 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"Bluestone Software Layes Foundation for Internet Operating Environment with Total-E-Server . . . " Screaming Media, Business Wire; Jun. 5, 2000; 3 pages.

"Developing ASP-Based Applications" from Microsoft Corporation © 1996.

"HTML Encyclopaedia"; http://www.scit.wlv.ac.uk/encyc/form.html; 2 pages.

"HTTP Made Really Easy—A Practical Guide to Writing Clients and Servers", by Marshall, Aug. 15, 1997.

Anderson, Richard; Homer, Alex; Howard, Rob; Sussman, Dave; "A Preview of Activer Server Pages+"; Copyright 2000, Wrox Press, pp. 1-73.

Article, ColdFusion Web Application Server, update and summary, from Allaire Corp—www@allaire.com.

Chapter 3, "Mechanics of Developing JavaScript Applications," Server-Side Javascript Guide, 'Online! 1999, pp. 51-108, www.Developer.netscape.com/docs/manuals, ssjs/1_4/ssjs.pdf>.

Chapter 6, "Session Management Service," Server-Side Javascript Guide, 'Online! 1999, pp. 125-166, www.developer.netscape.com/docs/manuals/ssjs/1_4/ssjs.pdf>.

Custer, Helen; "Inside Windows Nt"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dobson, R., "Data Binding in Dynamic HTML," DBMS MAG, 'Online! Mar. 1998 pp. 47-52.

Duan, Nick N.; "Distributed Database Access in a Corporate Environment Using Java" Bell Atlantic Corporation; 1996; 8 pages.

Esposito, Dino, "Heaven sent," Developer Network Journal, Mar.-Apr. 2001, Matt Publishing, UK, No. 23, pp. 18-24.

Franklin, K., "Supercharge Data Binding," Visual Basic Programmer's Journal, Mar. 2000, Fawcette Technical Publications, vol. 10, No. 3, pp. 32-33, 39-40, 42, 44, 46.

Frost, Jim: "Windows NT Security"; May 4, 1995; 7 pages; http://world.std.com/~jimf/papers/nt-security/nt-security.html.

Hammock swings through Web Interfaces (3 pages) by Eric Hammond.

Hammock(TM), Think of it as Swing(TM) for the Web (10 pages).

Holmes, John W.; e-Mail response to question regarding GET/POST. HTTP request, extracted from Google's News Groups, php.general, Nov. 11, 2002.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl 1 (May), 1999, pp. 109-111.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Kunz, T.; El Shentenawy, M.; Gaddah, A..; Hafez, R.; Image Transcoding for Wireless WWW Access: The User Perspective; Multimedia Computing and Networking 2002, Proceedings of SPIE vol. 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, vol. 21, No. 3, Oct. 2001, pp. 131-137.

Li, W.-S., et al., "PowerBookmarks: a system for personalizable Web information organization, sharing, and management,"Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

OOP Launches Hammock at JavaOne (1 page).

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Shapiro, M., "A Binding Protocol for Distributed Shared Objects," Proceedings of the International Conference on Distributed Computing Systems, Poznan, Poland, Jun. 21-24, 1994, Los Alamitos, IEEE Comp. Soc. Press.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310-319.

Stewart, Tony: "The Document as Application: Issues and Implications" GCA XML Europe 1999; pp. 575-599.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas-Zhang, Ya-Qin; "Scalable Video Transport over Wireless IP Networks"; IEEE 2000; pp. 1185-1191.

* cited by examiner

SOFTWARE BUILD EXTENSIBILITY

TECHNICAL FIELD

This disclosure relates in general to software build extensibility and in particular, by way of example but not limitation, to a pluggable build architecture that is capable of compiling into an assembly multiple files of arbitrary and/or expandable types.

BACKGROUND

Software, whether executing on a general-purpose processor or a specialized processor, significantly impacts many facets of modern life. When software is to be executed expeditiously, it is often supplied to processors in machine code form. However, it is usually far more difficult and time consuming for human programmers to write software in machine code form as compared to a higher-level language such as Fortran, C++, C#, Visual Basic, and so forth.

Consequently, most software is written in a so-called high-level language and then converted, or compiled, into machine code form. The conversion is effectuated with another software program called a compiler. Compilers take one or more files of a single file type and compile them into a program that is in machine code form.

As software proliferates, the number of different types of files increases. Furthermore, the level of actual and expected interoperability, as well as interconnectedness, between and among various hardware environments and software scenarios likewise continues to grow. Accordingly, there is a need for schemes and/or techniques that can handle different file types as both hardware environments and software scenarios change, grow, and evolve.

SUMMARY

In a first exemplary media implementation, one or more processor-accessible media include a build provider that is tailored for a particular file type, the build provider adapted to generate code from files corresponding to the particular file type and to contribute the generated code to a compilation.

In a second exemplary media implementation, one or more processor-accessible media include processor-executable instructions that, when executed, direct a device to perform actions including: accepting multiple files, each file of the multiple files corresponding to a respective file type and including source code; associating a build provider with each file of the multiple files in accordance with the corresponding respective file type; ascertaining the source code of each file of the multiple files via the associated build provider; and compiling the ascertained source code of each file of the multiple files into an assembly.

Other method, system, approach, apparatus, device, media, application programming interface (API), procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
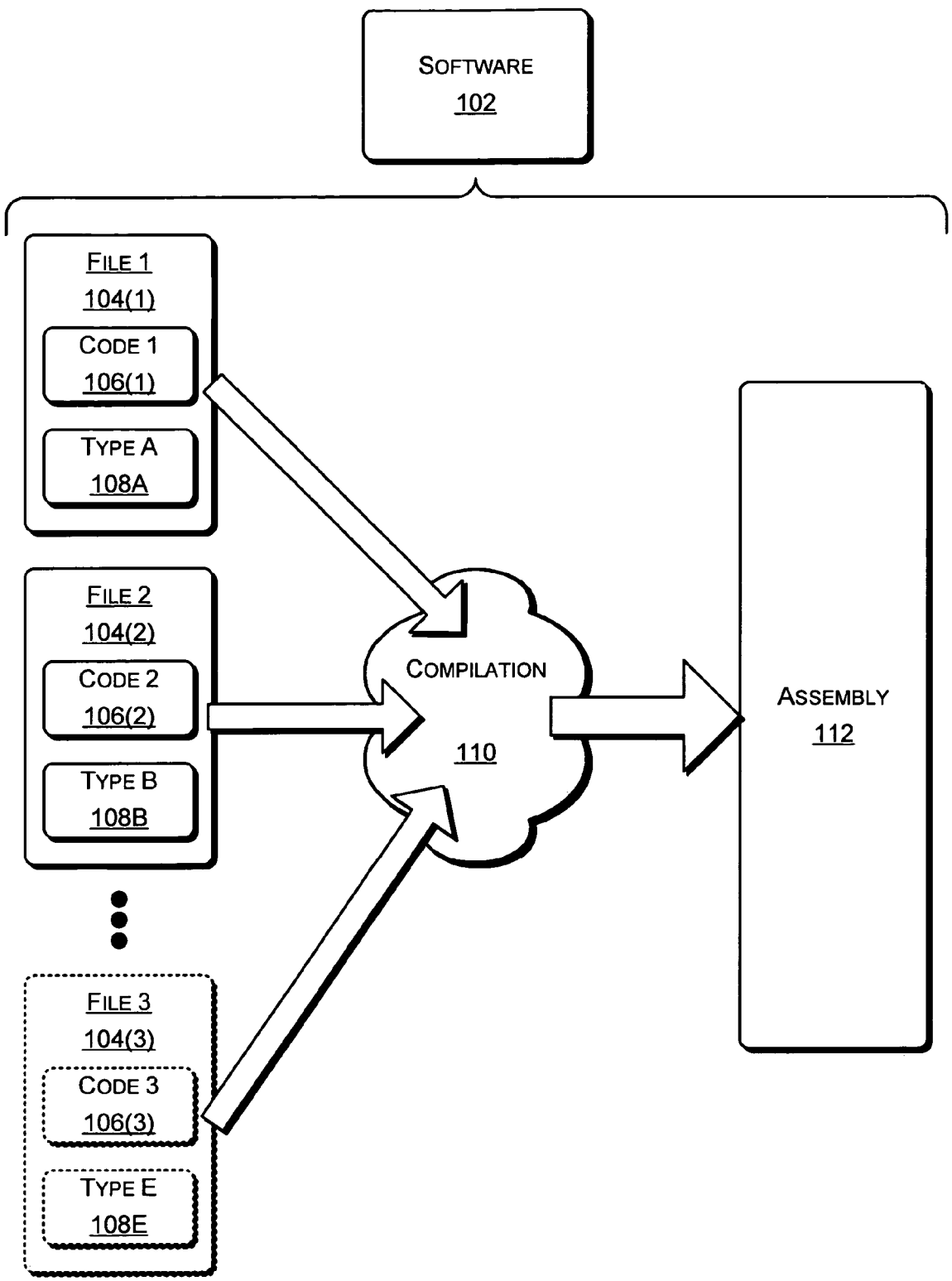
FIG. 1 illustrates an exemplary compilation of files having different file types into an assembly using software.

FIG. 1 illustrates an exemplary compilation 110 of files 104 having different file types 108 into an assembly 112 using software 102. Software 102 enables multiple files 104 of arbitrary (and possibly expanded/extended) types 108 to be compiled 110 into at least one assembly 112. Software 102 may be a primary or a secondary part of a larger program (e.g., an operating system (OS)), or software 102 may be an individual application.

As illustrated, three files 104(1), 104(2), and 104(3) are compiled. File 1 104(1) includes code 1 106(1) and is of a type A 108A. File 2 104(2) includes code 2 106(2) and is of a type B 108B. File 3 104(3) includes code 3 106(3) and is of a type E 108E. It should be understood that each file 104 may not physically include its code 106. However, the source code for each code 106 is inferable or otherwise derivable from the contents of its file 104. Although a finite number of files 104 and types 108 are illustrated in and/or indicated by FIG. 1, any number of files 104 and types 108 may be involved in a compilation 110 as orchestrated by software 102.

File 3 104(3) of type E 108E is shown with dashed lines to indicate that it represents an extended file type. In other words, file 3 104(3) of type E 108E may be compiled 110 into assembly 112 under the control and/or management of software 102 even if software 102 is originally designed and currently exists without direct and/or specific knowledge of files 104 of type E 108E. In fact, files 104 of type E 108E may be developed after software 102 is developed.

In a described implementation, software 102 provides management and/or hosting as part of an extensible build architecture. In operation, code 1 106(1) from file 1 104(1) of type A 108A, code 2 106(2) from file 2 104(2) of type B 108B, and code 3 106(3) from file 3 104(3) of type E 108E are jointly compiled 110 into an assembly 112. For example, software 102 may comprise a pluggable build architecture that interfaces with modules assigned to files 104. These modules may be tailored to the corresponding arbitrary file types 108 of files 104 in order to facilitate a compilation 110 of their code 106 into a target assembly 112.

Figure 2:
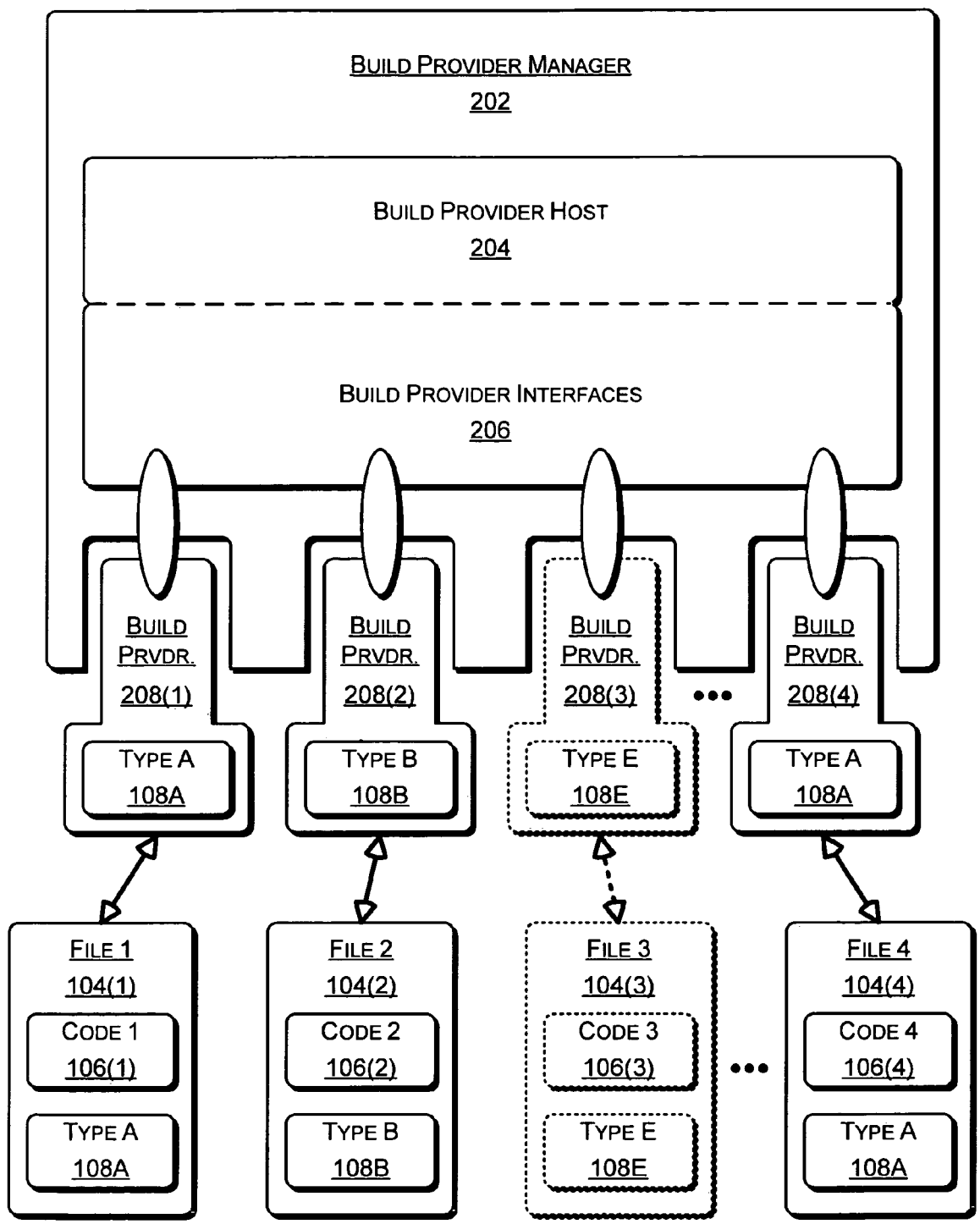
FIG. 2 illustrates an exemplary implementation of the software of FIG. 1 along with files having different file types.

FIG. 2 illustrates an exemplary implementation of the software of FIG. 1 along with files 104 having different file types 108. In addition to file 1 104(1), file 2 104(2), and file 3

104(3), a file 4 104(4) that includes code 4 106(4) and is of type A 108A is also being compiled. As illustrated, software 102 (not explicitly indicated in FIG. 2) includes at least one build provider manager 202, one or more build provider hosts 204, and build provider interfaces 206. Additionally, build providers 208 are associated with files 104.

In a described implementation, build provider interfaces 206 represent interfaces (e.g., APIs, including methods and/or properties) for (i) build providers 208 and (ii) build provider manager 202 and/or build provider host 204. Exemplary build provider interfaces 206 are described below especially for build provider host 204 and build providers 208 with reference to FIGS. 4 and 5, respectively.

Build provider manager 202 at least partially manages and/or controls compilation 110 directly and indirectly, including by way of build providers 208 and build provider host 204. Build provider manager 202 comprises at least part of a build system. For example, Active Server Pages (ASP) .NET from Microsoft® Corporation of Redmond, Wash. includes a general build system. Hence, build provider managers 202 may be implemented for just-in-time (JIT) compiling in a runtime environment, including non-Microsoft® common language runtimes such as the Java™ programming environment from Sun Microsystems®. Nevertheless, build provider managers 202 may alternatively embrace static compilation approaches and other processing environments.

Build provider host 204 is implemented by build provider manager 202. A build provider host 204 is typically instantiated once for each compilation 110. Each build provider host 204 provides services to build providers 208 that are involved in the corresponding compilation 110.

A respective build provider 208 is created (e.g., instantiated) for and/or assigned to each respective file 104. Build providers 208 are tailored for and/or correspond to particular file types 108. As illustrated, four build providers 208(1), 208(2), 208(3), and 208(4) are "plugged into" or interfacing with build provider manager 202. Build provider 208(1) corresponds to type A 108A, build provider 208(2) corresponds to type B 108B, build provider 208(3) corresponds to type E 108E, and build provider 208(4) also corresponds to type A 108A.

Although file 1 104(1) and file 4 104(4) are both of file type A 108A, each is assigned its own build provider 208. Hence, as indicated by the double-empty-headed arrows, build provider 208(1) is associated with file 1 104(1), build provider 208(2) is associated with file 2 104(2), build provider 208(3) is associated with file 3 104(3), and build provider 208(4) is associated with file 4 104(4). Although only four files 104 and four associated build providers 208 are illustrated in FIG. 2, any number of such file 104 and build provider 208 associations may alternatively participate in a given compilation 110. Furthermore, any number of files 104 of extended type E 108E may be involved.

The exemplary extensible build architecture as illustrated in FIG. 2 provides extensibility for new file types 108. A described pluggable build architecture implementation comprises software 102 that enables additions for new build providers 208 that can be associated with the new file types 108. Such software 102 enables the addition of new build providers 208 via build provider interfaces 206 of build provider host 204 and/or build provider manager 202.

Consequently, subsequent and/or outside developers can enable files 104 of extended file types 108E to be compiled 110 by build provider manager 202 along with files 104 of previous file types 108A, 108B, etc. With a relatively minor amount of coding to produce an appropriate build provider 208 for extended file type 108E, developers can enable files of extended file type 108E to be compiled. Moreover, developers can do so without having to worry about the complicated details surrounding compilation 110 and the resulting assembly 112. For example, build provider manager 202 and/or a more-encompassing (e.g., runtime) component can handle where the resulting assembly 112 should and is to live, how assembly 112 can be cached to disk so that it need not be recompiled every time it is to be used, and so forth.

Figure 3:
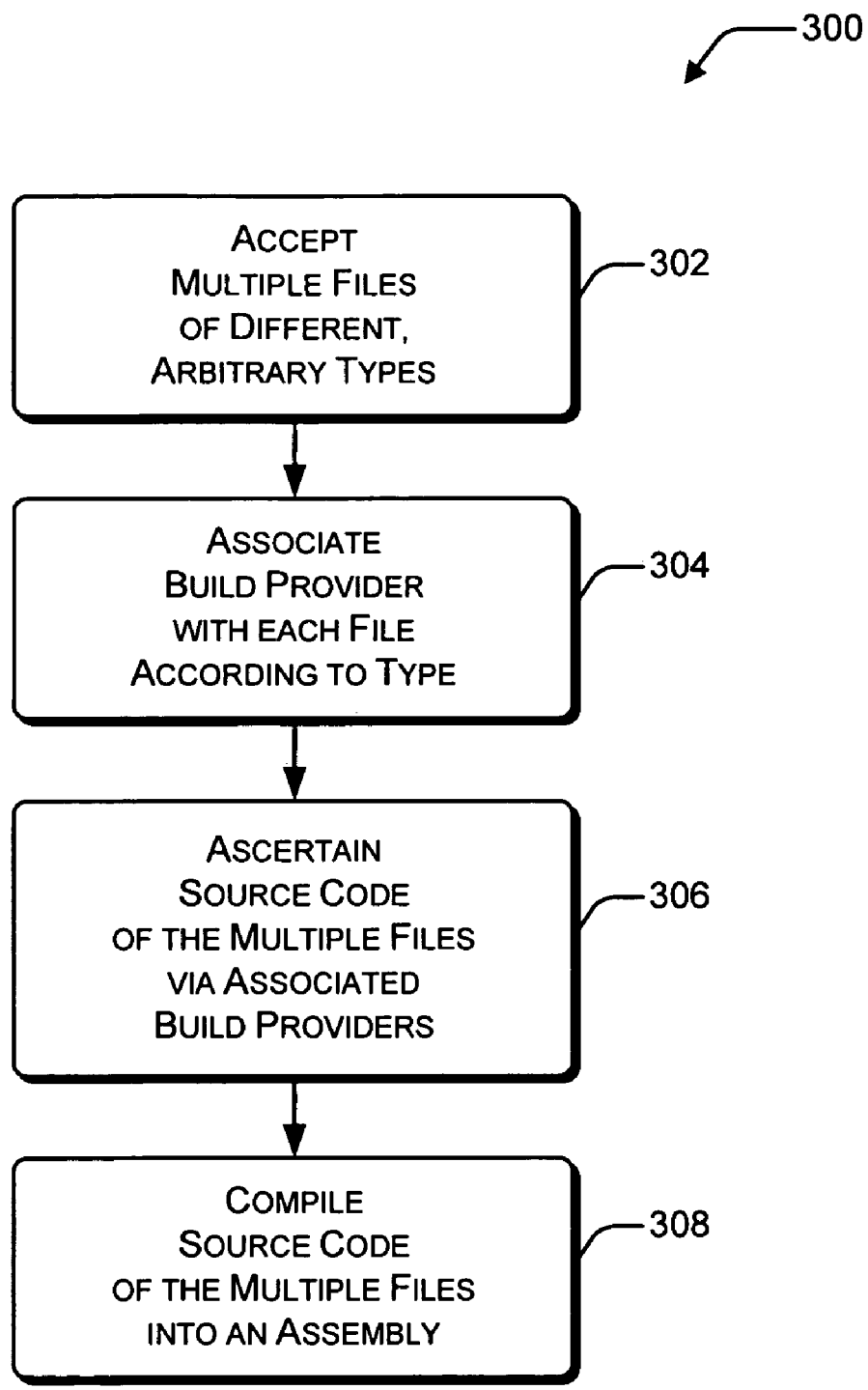
FIG. 3 is a flow diagram that illustrates an exemplary general method for compiling files having different file types into an assembly.

FIG. 3 is a flow diagram 300 that illustrates an exemplary general method for compiling files having different file types into an assembly. Flow diagram 300 includes four blocks 302-308. Although the actions of flow diagram 300 may be performed in other environments and with a variety of e.g. software schemes, FIGS. 1 and 2 are used in particular to illustrate certain aspects and examples of the method. For example, the actions of blocks 302-308 may be performed by the exemplary extensible build architecture of FIG. 2 in conjunction with exemplary compilation 110 of FIG. 1.

At block 302, multiple files of different, arbitrary types are accepted. For example, build provider manager 202 may accept for compilation file 1 104(1), file 2 104(2), file 3 104(3), and file 4 104(4). The files may be of one, two, three, or more different file types 108. For each particular file type 108, there may be one, two, three, or more different files 104 of that particular file type 108. The different, arbitrary file types 108 may possibly include a new expanded file type 108E.

Examples of types 108 include ".cs" (C# or C sharp), ".aspx" (pages), ".ascx" (user controls), ".asmx" (web services), ".ashx" (web handlers), ".wsdl" (web server description language file), ".arb" (arbitrary type), ".ext" (new extended type), and so forth. Although the preceding exemplary file types are indicated by file extension, other implementations may utilize an alternative indication scheme. For example, the file naming schemes for an Apple® OS, a Unix® OS, a Linux® OS, etc. may alternatively be used to indicate file types 108. Furthermore, file types 108 may be indicated in manners other than a file-naming scheme (e.g., a different file type attribute, tag, etc.).

At block 304, a build provider is associated with each respective file of the multiple files according to its corresponding file type. For example, build providers 208(1), 208(2), 208(3), and 208(4) may be associated with files 1 104(1), 2 104(2), 3 104(3), and 4 104(4), respectively. A one-to-one correspondence may be established in certain implementations between files 104 and build providers 208 such that multiple build providers 208 corresponding to a single file type 108 are instantiated when multiple files 104 of the single file type 108 are accepted. For instance, file 1 104(1) and file 4 104(4) are both of type A 108A, so two build providers 208 that are tailored for type A 108A are instantiated (e.g., build provider 208(1) and build provider 208(4)).

At block 306, source code for each of the multiple files is ascertained via the associated build providers. For example, respective build providers 208 may ascertain the code 106 of respective associated files 104. For instance, build provider 208(1) ascertains code 1 106(1) from file 1 104(1), build provider 208(2) ascertains code 2 106(2) from file 2 104(2), build provider 208(3) ascertains code 3 106(3) from file 3 104(3), and build provider 208(4) ascertains code 4 106(4) from file 4 104(4).

At block 308, the ascertained source code of the multiple files is compiled into an assembly. For example, build provider host 204 (and/or build provider manager 202) may cause code 1 106(1), code 2 106(2), code 3 106(3), and code 4 106(4) to be compiled 110 into assembly 112. Assembly 112 may be, for example, machine-consumable object code, a dynamic link library or executable file in any general OS environment (e.g., a .dll file or a .exe file, respectively, in a Microsoft® Windows environment), intermediate language (IL) code that is subsequently JIT compiled in a runtime environment (e.g., a common language runtime (CLR) from any given vendor), some combination thereof, and so forth.

Figure 4:
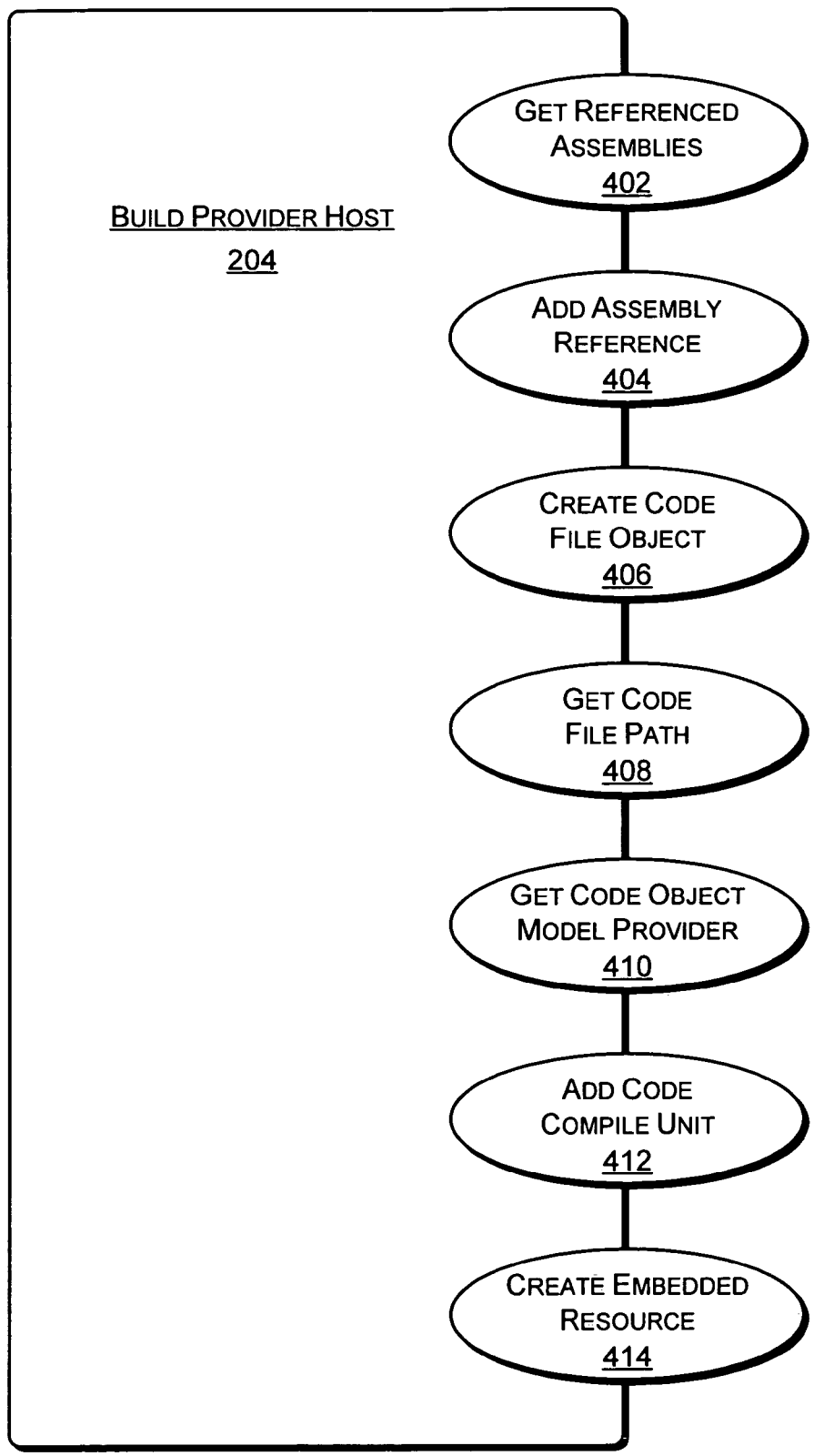
FIG. 4 is an exemplary build provider host that illustrates multiple available interfaces thereof.

FIG. 4 is an exemplary build provider host 204 that illustrates multiple available interfaces 402-414 thereof. Specifically, build provider host 204 includes the following exemplary methods and properties: get referenced assemblies 402, add assembly reference 404, create code file object 406, get code file path 408, get code object model provider 410, add code compile unit 412, and create embedded resource 414. Although seven exemplary interfaces 402-414 are shown and described with respect to build provider host 204, alternative implementations may have more or fewer such interfaces.

In a described implementation, interfaces 402-414 facilitate actions and/or communications between build provider host 204 and multiple build providers 208, especially with regard to providing services to build providers 208 during compilation 110. Get referenced assemblies 402 returns a collection of one or more assemblies with which build providers 208 are intended to be compiled. Add assembly reference 404 adds at least one assembly that can be referenced during compilation 110. For example, if a particular build provider 208 needs or prefers a given assembly in order to have the particular code 106 of its particular file 104 compiled, then that particular build provider 208 requests that the given assembly be included in compilation 110.

Create code file object 406 creates a file object that is to include new source code for compilation 110. A build provider 208 adds new source code 106 to the file object from an associated file 104. The new source code can subsequently be included in compilation 110 from the code file object. An example of a suitable code file object mechanism is TextWriter of Microsoft® Corporation's ASP .NET. With a TextWriter implemenation, build provider 208 writes the new source code to a file using the returned TextWriter. Another example of a suitable code file object mechanism is StringWriter of Java™ from Sun Microsystem®.

Get code file path 408 returns a path to a file whose source code is to be included in compilation 110. In a described implementation, the path is a physical file path; however, the path may alternatively employ a virtual or some other mechanism. Additionally, the file is typically actually created by build provider 208, instead of build provider host 204. After creation of the returned file, build provider 208 adds to it the new source code 106 of an associated file 104 for compilation 110. In an environment that utilizes file extensions, the source file is given the correct extension for the designated language, as is addressed further herein below.

Get code object model provider 410 returns a code object model provider that can be used by build provider 208 to generate a code compile unit. A code compile unit is a high-level, language independent expression of a coding construct. The code object model provider is a mechanism for describing the coding in a language independent manner as a code compile unit. An example of such a code object model provider/code compile unit paradigm is the CodeDOM aspect of Microsoft® Corporation's ASP NET. With CodeDOM, the employed mechanism for expressing the desired coding construct is an object tree structure.

Add code compile unit 412 enables a build provider 208 to add a code compile unit to a compilation 110. Add code compile unit 412 is typically used after get code object model provider 410 in conjunction with a code compile unit that has been generated by the acquired code object model provider.

Add code compile unit 412 may therefore be used in lieu of create code file object 406 or get code file path 408 by a build provider 208 that is attempting to contribute its code 106 of its associated file 104 to compilation 110 in a language-independent manner. A code object model provider/code compile unit paradigm is described further below with reference to FIGS. 6 and 7, especially with regard to blocks 610, 614, and 710'''.

Create embedded resource 414 creates a new resource that is to be added to compilation 110. The calling build provider 208 can write the desired resource using a returned stream, for example. Examples of such resources that build providers 208 may wish to include in compilation 110 are: localizable resources, text localized to different languages, an image file, and so forth.

Figure 5:
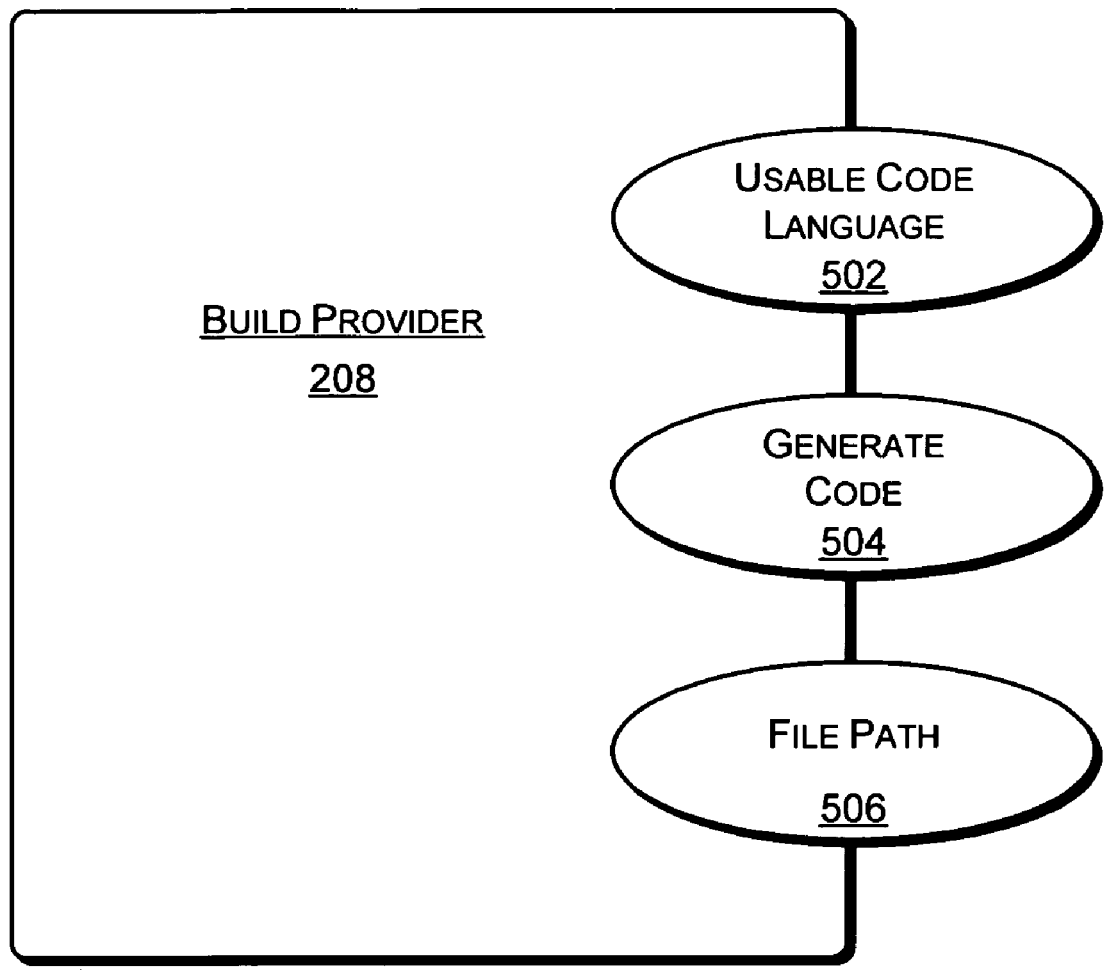
FIG. 5 is an exemplary build provider that illustrates multiple available interfaces thereof.

FIG. 5 is an exemplary build provider 208 that illustrates multiple available interfaces 502-506 thereof. Specifically, build provider 208 includes the following exemplary methods and properties: usable code language 502, generate code 504, and file path 506. Although three exemplary interfaces 502-506 are shown and described with respect to build provider 208, alternative implementations may have more or fewer such interfaces.

In a described implementation, interfaces 502-506 facilitate actions and/or communications between build providers 208 and build provider host 204, especially with regard to participation by build providers 208 in compilation 110. Usable code language 502 returns a language that build provider 208 uses, or it can return null if build provider 208 can use any language (i.e., if build provider 208 is language agnostic).

Generate code 504 asks build provider 208 to generate code 106 of a file 104 to which it is associated. The generation/contribution can be effectuated using any of a variety of mechanisms, including those mechanisms (e.g., methods) exposed by build provider host 204. These mechanisms include (i) create code file object 406, (ii) get code file path 408, (iii) get code object model provider 410/add code compile unit 412, (iv) some combination thereof, and so forth.

File path 506 gets or sets a path to the associated file 104 that build provider 208 is responsible for handling during compilation 110. In a described implementation, the path is a virtual file path; however, the path may alternatively be physical or employ some other file identification mechanism. For a virtual path implementation, a virtual path may map to a physical path, without necessarily having a one-to-one correspondence between the two different kinds of paths.

Figure 6:
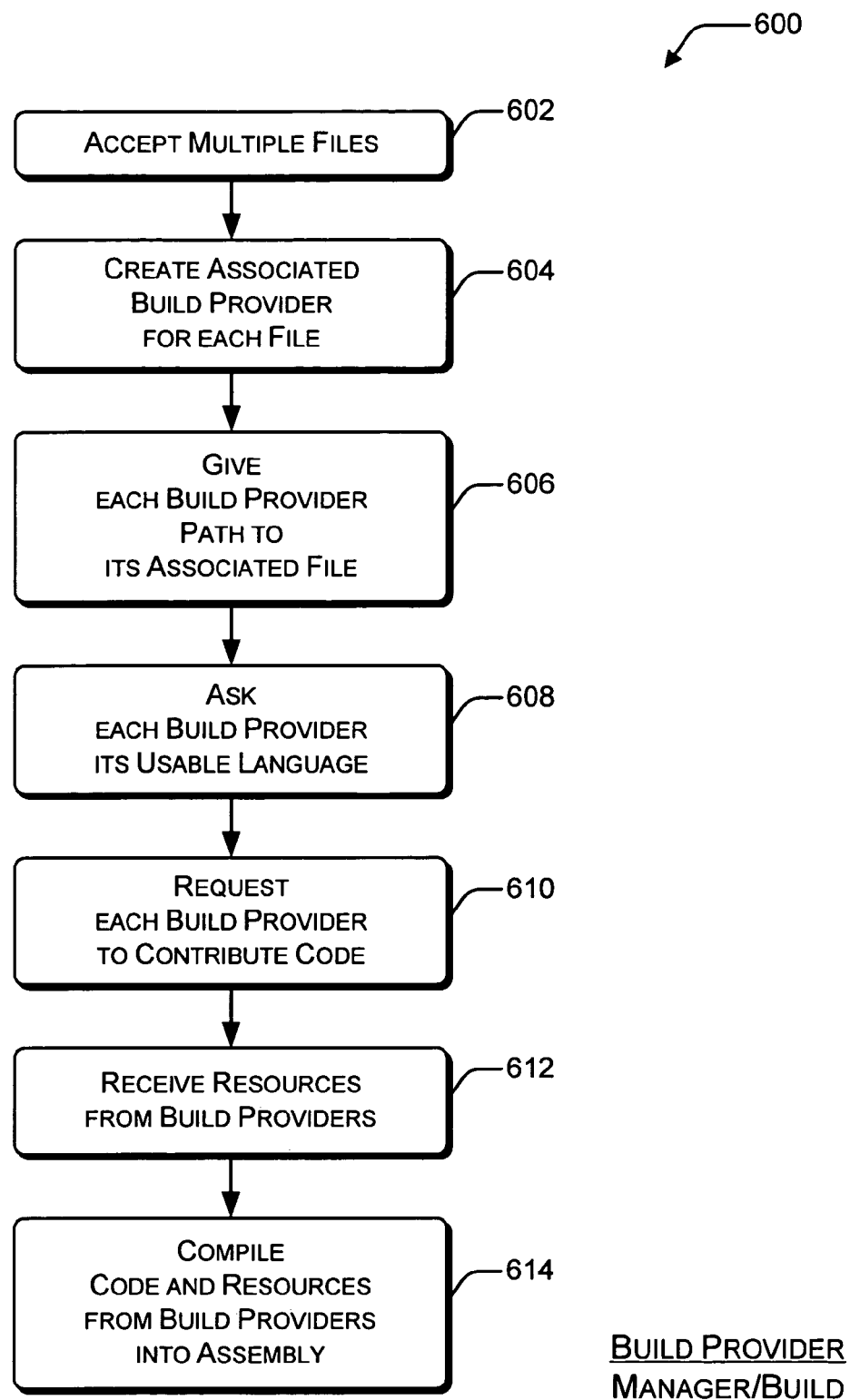
FIG. 6 is a flow diagram that illustrates an exemplary method for compiling files having different file types into an assembly from the perspective of a build provider host and build provider manager.

FIGS. 6-9 are described together with interrelated references to each other. FIG. 6 is a flow diagram 600 that illustrates an exemplary method for compiling files having different file types into an assembly from the perspective of a build provider host 204 and build provider manager 202. Flow diagram 600 includes seven blocks 602-614. Although the actions of flow diagram 600 may be performed in other environments and with a variety of e.g. software schemes, FIGS. 1, 2, 4, and 5 and in particular 8 and 9 are used to illustrate certain aspects and examples of the method.

Figure 7:
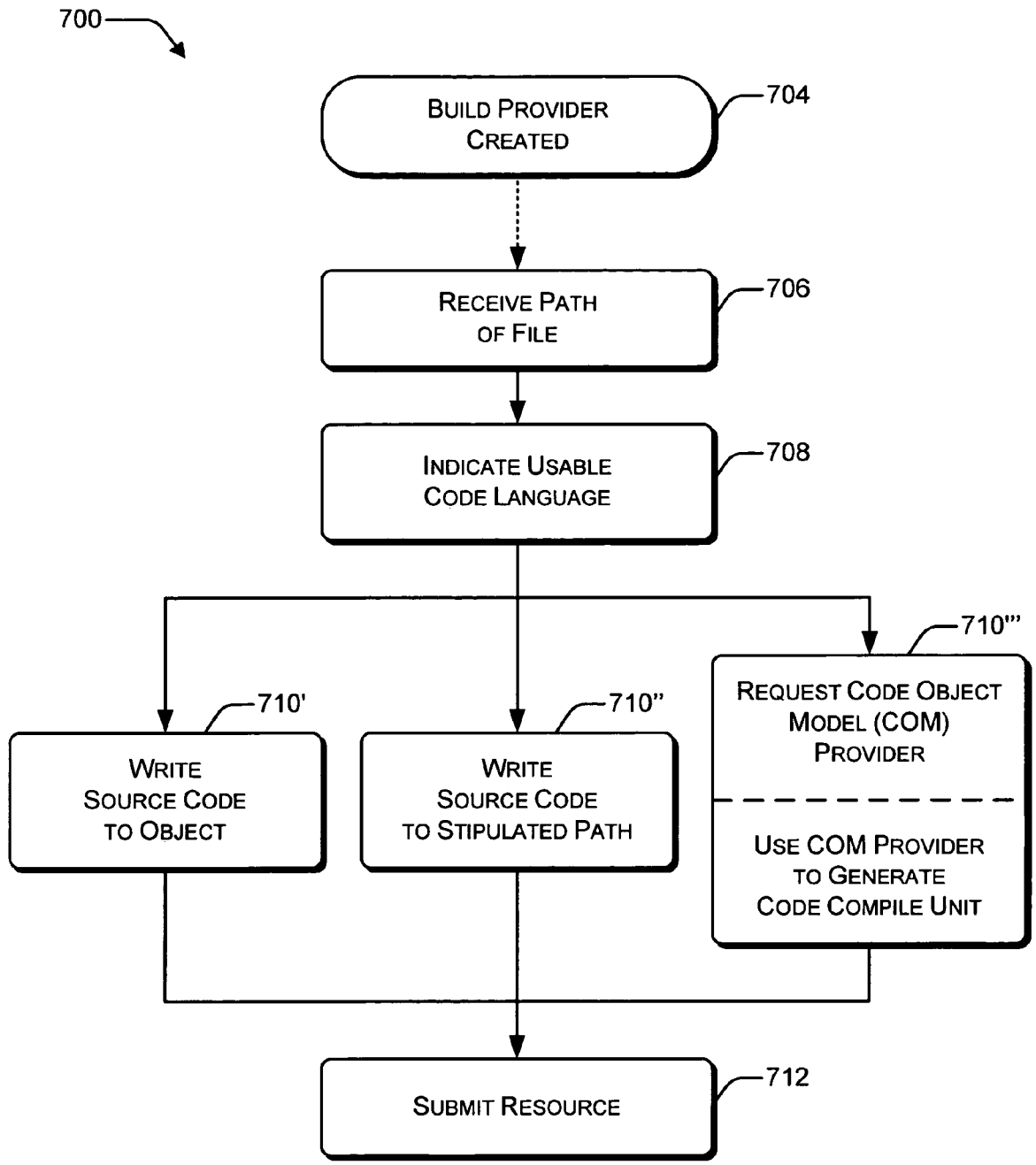
FIG. 7 is a flow diagram that illustrates an exemplary method for compiling files having different file types into an assembly from the perspective of a build provider.

FIG. 7 is a flow diagram 700 that illustrates an exemplary method for compiling files having different file types into an assembly from the perspective of a build provider 208. Flow diagram 700 includes seven blocks 704, 706, 708, 710', 710'', 710''', and 712. Although the actions of flow diagram 700 may be performed in other environments and with a variety of e.g. software schemes, FIGS. 1, 2, 4, and 5 and in particular 8 and 9 are used to illustrate certain aspects and examples of the method. Generally, respective action is 604-612 of FIG. 6 are related to respective actions 704-712 of FIG. 7.

Figure 8:
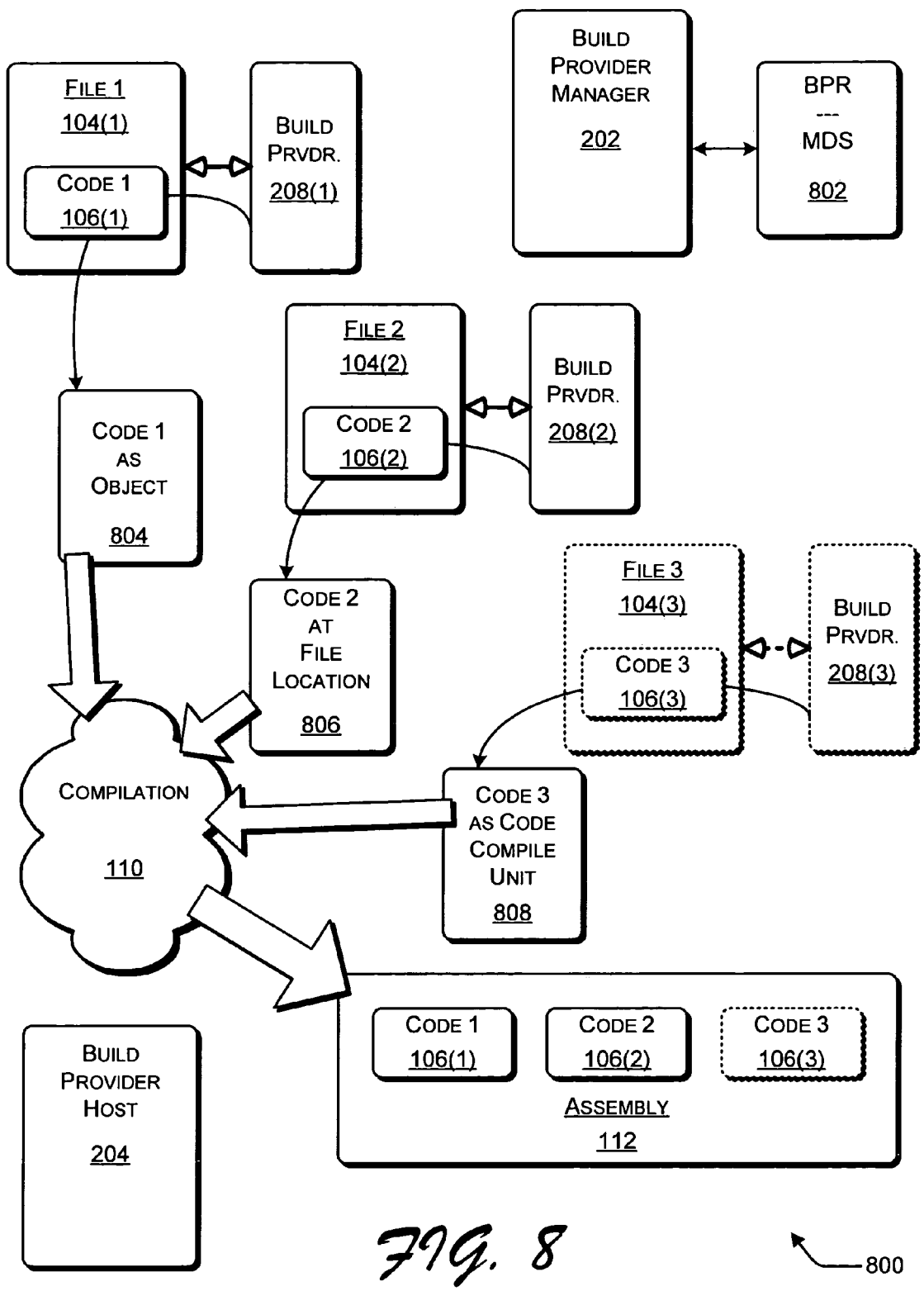
FIG. 8 is a block diagram that illustrates an exemplary approach for compiling files having different file types into an assembly.
Figure 9:
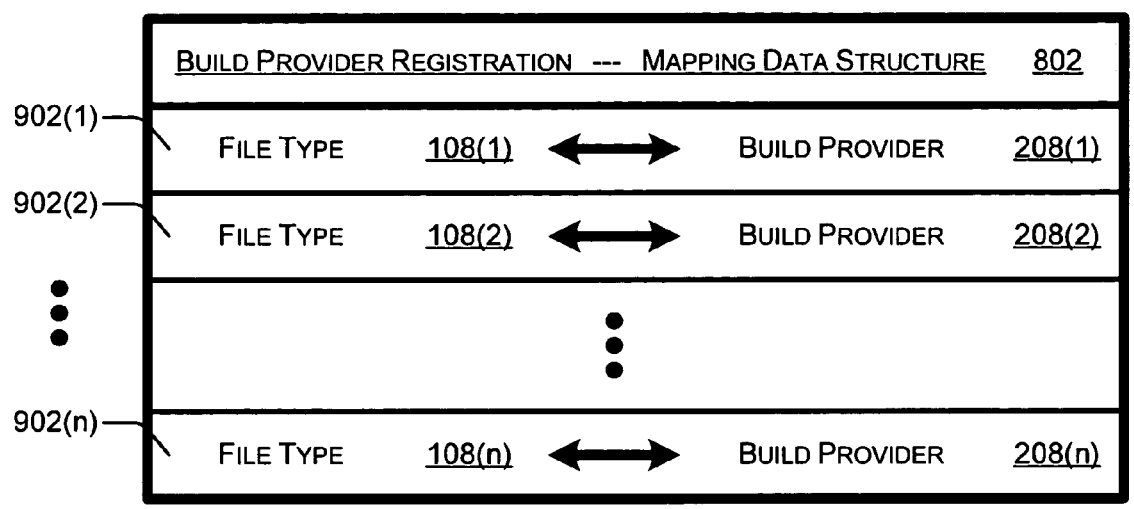
FIG. 9 is an exemplary mapping data structure for build provider registration as shown in FIG. 8.

FIG. 8 is a block diagram 800 that illustrates an exemplary approach for compiling files 104 having different file types into an assembly 112. FIG. 9 is an exemplary mapping data structure 802 for build provider registration as shown in FIG. 8. Block diagram 800 includes a build provider manager 202 and a build provider host 204 thereof. Build provider manager 202 has access to build provider registration-mapping data structure (BPR-MDS) 802.

As illustrated, three files 104 include code 106. Specifically, file 1 104(1) includes code 1 106(1), file 2 104(2) includes code 2 106(2), and file 3 104(3) includes code 3 106(3). Also, three respective files 104 are associated with three respective build providers 208. Specifically, file 1 104(1) is associated with build provider 208(1), file 2 104(2) is associated with build provider 208(2), and file 3 104(3) is associated with build provider 208(3). Although not explicitly shown in FIG. 8 for the sake of clarity, each file 104 and each associated build provider 208 correspond to a particular file type 108 (e.g., as shown in FIG. 2).

In a described implementation, build provider manager 202 and/or build provider host 204 manage and/or control compilation 110. Compilation 110 entails compiling the source code of code 1 106(1), code 2 106(2), and code 3 106(3) into a single target assembly 112. The files 104, in which the source code of code 106 is located, may be of arbitrary and different file formats that are possibly unrelated to each other.

For flowchart 600 (of FIG. 6) at block 602, multiple files are accepted. For example, build provider manager 202 may accept file 1 104(1), file 2 104(2), and file 3 104(3). As shown in the example of FIG. 2, file 1 104(1) corresponds to type A 108A, file 2 104(2) corresponds to type B 108B, file 3 104(3) corresponds to type E 108E.

At block 604, an associated build provider is created for each file. For example, with reference to BPR-MDS 802, build provider manager 202 may create a respective build provider 208 for each respective file 104. For instance, build provider 208(1) is created for file 1 104(1), build provider 208(2) is created for file 2 104(2), and build provider 208(3) is created for file 3 104(3). In a described implementation, BPR-MDS 802 maps file types 108 to different types of build providers 208.

In FIG. 9, BPR-MDS 802 has multiple entries 902 in which each entry 902 includes a particular file type 108 and a denotation of a build provider 208 that can handle files 104 of that particular file type 108. Specifically, entry 902(1) maps file type 108(1) to (a denotation of) build provider 208(1), entry 902(2) maps file type 108(2) to (a denotation of) build provider 208(2), and entry 902(n) maps file type 108(n) to (a denotation of) build provider 208(n). As indicated by the index "n", any number of mapping entries 902 may be included in BPR-MDS 802.

In certain implementations, such as those in a Microsoft® Windows® environment, BPR-MDS 802 may be realized as a registration portion of a configuration file. Furthermore, each file type 108 may be indicated by a file extension such as .cs, .aspx, .ascx, .asmx, .ashx, .wsdl, .arb, ".new/.abc" (for a new type), .ext, and so forth.

Hence, build providers 208 that are to participate in compilations 110 are registered in a configuration file. Although a BPR-MDS 802 may be utilized in other OS environments, an example of a BPR-MDS 802 as part of a configuration file in a Microsoft® Windows® environment follows:

<buildProviders>
  <add extension=".acme"
    type="Acme.MyCustomBuildProvider, AcmeAssembly"/>
</buildProviders>

This registers a build provider 208 to handle files with an ".acme" extension by mapping a file type 108 of ".acme" to build provider 208 of "Acme.MyCustomBuildProvider". This build provider 208 lives in the class Acme.MyCustomBuildProvider in the assembly AcmeAssembly.dll. The build provider 208 of "Acme.MyCustomBuildProvider" extends an exemplary "BuildProvider" class, which is described below in a section entitled "Exemplary Descriptions for BuildProviderHost and BuildProvider Classes".

For flowchart 700 (of FIG. 7) at block 704, a build provider is created. As indicated by the rounded rectangle 704 and the dashed arrow extending therefrom, build provider 208 is created (e.g., instantiated) prior to the actions of blocks 706-712 being performed by build provider 208.

At block 606, each build provider is given a path to its associated file. For example a path (e.g., a physical or virtual path) for file 1 104(1) is given to build provider 208(1), a path for file 2 104(2) is given to build provider 208(2), and a path for file 3 104(3) is given to build provider 208(3). These paths may be given by build provider manager 202 and/or build provider host 204 to build providers 208(1, 2, and 3) by calling their respective file path 506 interfaces. At block 706, each build provider receives the path of its associated file. For example, respective build providers 208(1, 2, and 3) receive paths for their respective files 104(1, 2, and 3) via their respective file path 506 interfaces.

At block 608, each build provider is asked for its usable language. For example, build provider manager 202 and/or build provider host 204 invoke the usable code language 502 method of each build provider 208(1, 2, and 3). In response, at block 708, each build provider indicates its usable code language. Each build provider 208 can use a specific language for the source code 106 of its associated file 104, or it can use any language. Thus, each build provider 208 can indicate a specific language (e.g., C#, Visual Basic, etc.) or that it does not care which language is used (e.g., that it is language agnostic by returning null). The language indicated by build providers 208 is designated as the language that is to be used for compilation 110.

In a described implementation, in order to compile 110 the various codes 106 into one assembly 112, each build provider 208 has the same language or is language agnostic. In other words, assembly 112 is formed from codes 106 that are from the same language or are language independent (e.g., under a get code object model provider 410/add code compile unit 412 mechanism). Thus, for a group of codes 106 that is to be compiled 110 into an assembly 112, each code 106 of the group is all the same language, all language agnostic, or all the same language with some that are language agnostic. If all build providers 208 for a given grouping are language agnostic, then a default language is used as the designated language.

At some time after respective build providers 208 are associated with respective files 104 (at blocks 604 and 704), build providers 208 may optionally call the get referenced assemblies 402 interface of build provider host 204. The assemblies to be referenced in compilation 110 are returned to build providers 208. Based on each build provider's 208 associated file 104, for example, each build provider 208 determines whether an additional assembly or assemblies may be required or preferred when compiling the code 106 included as part of its associated file 104. If so, the relevant build providers 208 call the add assembly reference 404 interface of build provider host 204 to have such assembly or assemblies added. Of course, a particular assembly may be added once by build provider host 204 regardless of the number of relevant build providers 208 that call add assembly reference 404 for the particular assembly. This add assembly reference 404 interface can be especially helpful when classes are being extended in a given compilation 110.

At block 610, each build provider is requested to contribute code. For example, build provider host 204 may make a call to the generate code 504 interface of each build provider 208(1), 208(2), and 208(3) (e.g., in a sequential fashion). As indicated by blocks 710', 710", and 710'", build providers 208 may contribute code 106 of their respective files 104 in any of three different exemplary manners/mechanisms for compilation 110. It should be noted that a given build provider 208 can contribute code 106 more than once, either by using the same contribution manner multiple times or by using an arbitrary combination of any two or more of the three described (or other) contribution manners. The three contribution manners of a described implementation are shown at blocks 804, 806, and 808 of FIG. 8. As described further below, block 804 relates to block 710', block 806 relates to block 710", and block 808 relates to block 710'".

Generally, each build provider 208 is associated with a file 104 of a type 108 to which each corresponds. Consequently, a particular build provider 208 of a particular type 108 is adapted to comprehend, parse, dissect, etc. an associated particular file 104 of the particular type 108, and it is therefore capable of generating the code 106 from the associated particular file 104. It should be noted that code 106 may be contiguous or discontinuous, comprised of one or more modules, intermixed with other non-code portions, directly or indirectly derived from non-code portion(s), and so forth.

Depending on the format of the particular type 108 and/or the capabilities/configuration of the particular build provider 208, the generated code 106 that is to be contributed to compilation 110 may or may not be the entirety of the code that is included as part of the particular file 104. For example, a section of code may be commented out, a particular code portion may not be applicable to compilation 110 and/or the target assembly 112, and so forth. Furthermore, build providers 208 may have the ability to generate (and therefore contribute) source code from non-code portion(s) of files 104. Thus, source code to be contributed to a compilation 110 is generated based on a particular build provider 208 and a particular associated file 104 (or more generally from files 104 of the same corresponding type 108 as the particular build provider 208).

At block 710', source code is written to an object. For example, build provider 208(1) may cause code 1 106(1) of file 1 104(1) to be written to a code file object at block 804 in order to contribute code 1 106(1) to compilation 110. For instance, build provider 208(1) may call the create code file object 406 interface of build provider host 204 in order to acquire a code file object to which code 1 106(1) may be added.

At block 710", source code is written to a stipulated path. For example, build provider 208(2) may write code 2 106(2) of file 2 104(2) to a file at a location stipulated by a path acquired from build provider host 204 at block 806 in order to contribute code 2 106(2) to compilation 110. For instance, build provider 208(2) may call the get code file path 408 interface of build provider host 204 in order to acquire the path to a file to be created by build provider 208(2) to which code 2 106(2) is added.

At block 710'", a code object model (COM) provider is requested and the code object model provider is used to generate a code compile unit. For example, build provider 208(3) may request a code object model provider from build provider host 204, and build provider 208(3) may subsequently employ the code object model provider to generate a code compile unit for code 3 106(3) of file 3 104(3) at block 808 in order to contribute code 3 106(3) to compilation 110. For instance, build provider 208(3) may call the get code object model provider 410 interface as well as the add code compile unit 412 interface of build provider host 204 in order to acquire and use a code object model provider.

The code compile unit 808 for code 3 106(3) is generated, and may be contributed, as a language-independent structure. In this example, build provider 208(3) is language agnostic inasmuch as the language-independent structure may be converted into any desired language. In a described implementation, build provider host 204 performs or causes to be performed the conversion of the language-independent structure to source code in the designated language for compilation 110. Alternatively, some other entity, such as build provider manager 202 or build provider 208(3), may perform this conversion.

As illustrated in FIG. 8, build provider 208(1) uses a writable object mechanism for code contribution, build provider 208(2) uses a writable file path location mechanism for code contribution, and build provider 208(3) uses a code object model provider/code compile unit mechanism for code contribution. However, any given build provider 208 may be capable of using any one or more mechanisms for contributing code, optionally including the use of multiple mechanisms in a single compilation 110.

By way of example, new file types 108E that correspond to an extended build provider 208 (e.g., build provider 208(3)) may use a writable object mechanism and/or a writable file path mechanism, as well as the illustrated code object model provider/code compile unit mechanism. Likewise, a pre-planned or built-in build provider 208 (e.g., build providers 208(1) and 208(2)) may employ a code object model provider/code compile unit mechanism. Furthermore, build providers 208 that are not language-agnostic may use a code object model/code compile unit mechanism. In such cases, the code object model contains some nodes that are language-specific along with other nodes that are language-agnostic.

At block 712, zero, one or more resources are submitted. For example, build providers 208(1, 2, and/or 3) may submit to build provider host 204 resource(s) for use in compilation 110. For instance, each relevant build provider 208 may call the create embedded resource 414 interface of build provider host 204. At block 612, resources (including notifications thereof) are received from build providers 208. For example, build provider host 204 may receive submitted resources (not explicitly shown in FIG. 8) from one or more build providers 208.

At block 614, code and resources (if any) from multiple build providers are compiled into an assembly. For example, build provider host 204 may launch a compiler (e.g., a compiler for the designated language) to compile code 1 106(1) from the writable object of block 804, code 2 106(2) from the stipulated file location of block 806, and code 3 106(3) from the language-converted code compile unit of block 808 into target assembly 112. Compilation 110 therefore causes assembly 112 to include and be derived from source code of code 1 106(1), code 2 106(2), and code 3 106(3). This compilation 110 may be effectuated even when a file type 108 of a file 104 that is participating in compilation 110 is developed after build provider manager 202 and/or build provider host 204 is developed, as well as when files 104 are unrelated to one another.

The actions, aspects, features, components, etc. of FIGS. 1-9 are illustrated in diagrams that are divided into multiple blocks. However, the order, interconnections, interrelationships, layout, etc. in which FIGS. 1-9 are described and/or shown is not intended to be construed as a limitation, and any number of the blocks can be modified, combined, rearranged, augmented, omitted, etc. in any manner to implement one or more systems, methods, devices, procedures, media, APIs, apparatuses, arrangements, etc. for software build extensibility. Furthermore, although the description herein includes references to specific implementations (and the exemplary operating environment of FIG. 10), the illustrated and/or described implementations can be implemented in any suitable hardware, software, firmware, or combination thereof and using any suitable software architecture(s), source code language(s), code contribution mechanism(s), compiling scheme(s), and so forth.

Exemplary Operating Environment for Computer or Other Device

Figure 10:
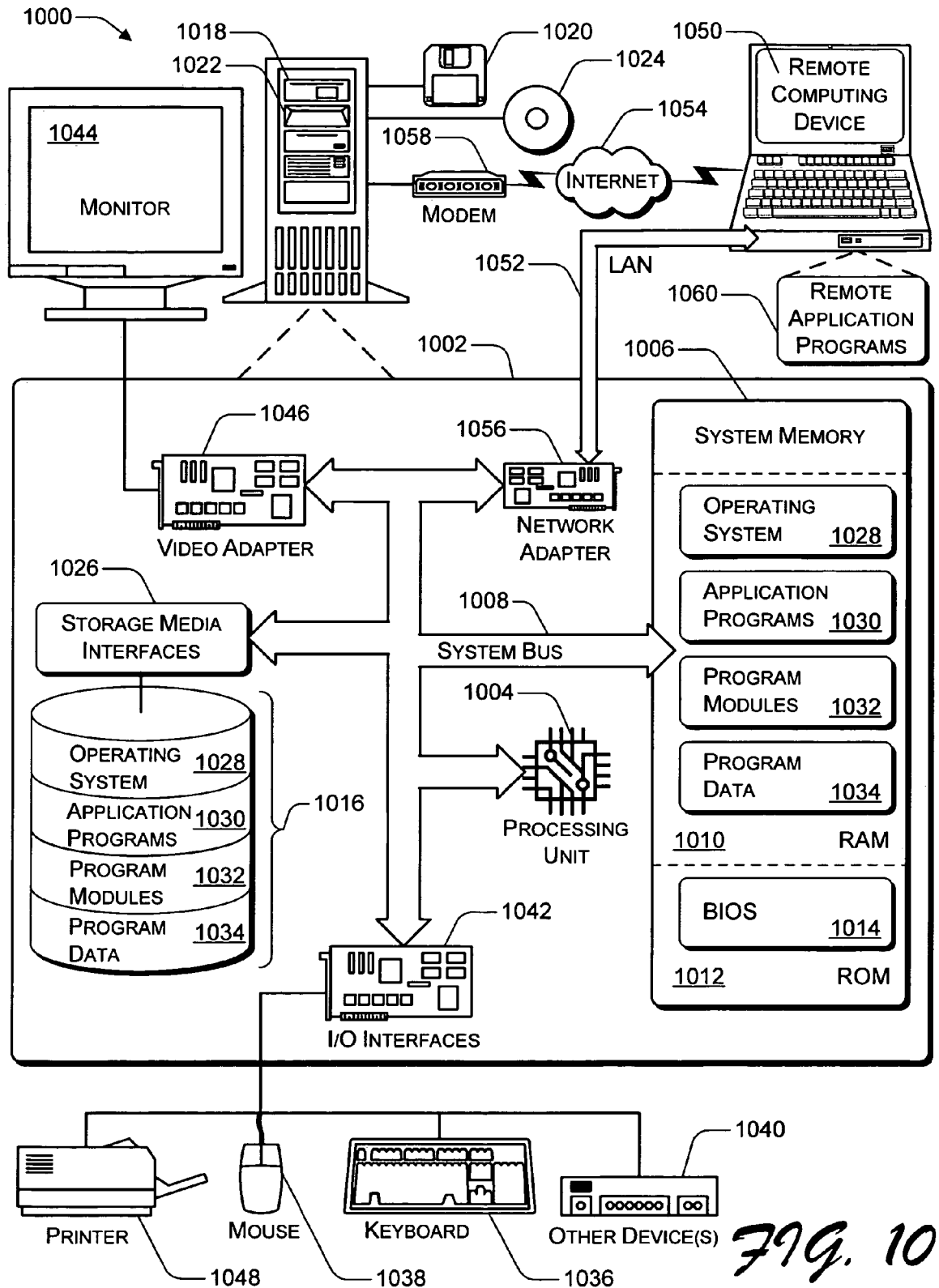
FIG. 10 illustrates an exemplary computing (or general device) operating environment that is capable of (wholly or partially) implementing at least one aspect of software build extensibility as described herein.

FIG. 10 illustrates an exemplary computing (or general device) operating environment 1000 that is capable of (fully or partially) implementing at least one system, device, apparatus, component, arrangement, protocol, approach, method, procedure, media, API, some combination thereof, etc. for software build extensibility as described herein. Operating environment 1000 may be utilized in the computer and network architectures described below.

Exemplary operating environment 1000 is only one example of an environment and is not intended to suggest any limitation as to the scope of use or functionality of the applicable device (including computer, network node, entertainment device, mobile appliance, general electronic device, etc.) architectures. Neither should operating environment 1000 (or the devices thereof) be interpreted as having any dependency or requirement relating to any one or to any combination of components as illustrated in FIG. 10.

Additionally, software build extensibility may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, distributed or multi-processing computing environments that include any of the above systems or devices, some combination thereof, and so forth.

Implementations for software build extensibility may be described in the general context of processor-executable instructions. Generally, processor-executable instructions include routines, programs, modules, protocols, objects, interfaces, components, data structures, etc. that perform and/or enable particular tasks and/or implement particular abstract data types. Software build extensibility, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 1000 includes a general-purpose computing device in the form of a computer 1002, which may comprise any (e.g., electronic) device with computing/processing capabilities. The components of computer 1002 may include, but are not limited to, one or more processors or processing units 1004, a system memory 1006, and a system bus 1008 that couples various system components including processor 1004 to system memory 1006.

Processors 1004 are not limited by the materials from which they are formed or the processing mechanisms employed therein. For example, processors 1004 may be comprised of semiconductor(s) and/or transistors (e.g., electronic integrated circuits (ICs)). In such a context, processor-executable instructions may be electronically-executable instructions. Alternatively, the mechanisms of or for processors 1004, and thus of or for computer 1002, may include, but are not limited to, quantum computing, optical computing, mechanical computing (e.g., using nanotechnology), and so forth.

System bus 1008 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1002 typically includes a variety of processor-accessible media. Such media may be any available media that is accessible by computer 1002 or another (e.g., electronic) device, and it includes both volatile and non-volatile media, removable and non-removable media, and storage and transmission media.

System memory 1006 includes processor-accessible storage media in the form of volatile memory, such as random access memory (RAM) 1040, and/or non-volatile memory, such as read only memory (ROM) 1012. A basic input/output system (BIOS) 1014, containing the basic routines that help to transfer information between elements within computer 1002, such as during start-up, is typically stored in ROM 1012. RAM 1010 typically contains data and/or program modules/instructions that are immediately accessible to and/or being presently operated on by processing unit 1004.

Computer 1002 may also include other removable/non-removable and/or volatile/non-volatile storage media. By way of example, FIG. 10 illustrates a hard disk drive or disk drive array 1016 for reading from and writing to a (typically) non-removable, non-volatile magnetic media (not separately shown); a magnetic disk drive 1018 for reading from and writing to a (typically) removable, non-volatile magnetic disk 1020 (e.g., a "floppy disk"); and an optical disk drive 1022 for reading from and/or writing to a (typically) removable, non-volatile optical disk 1024 such as a CD, DVD, or other optical media. Hard disk drive 1016, magnetic disk drive 1018, and optical disk drive 1022 are each connected to system bus 1008 by one or more storage media interfaces 1026. Alternatively, hard disk drive 1016, magnetic disk drive 1018, and optical disk drive 1022 may be connected to system bus 1008 by one or more other separate or combined interfaces (not shown).

The disk drives and their associated processor-accessible media provide non-volatile storage of processor-executable instructions, such as data structures, program modules, and other data for computer 1002. Although exemplary computer 1002 illustrates a hard disk 1016, a removable magnetic disk 1020, and a removable optical disk 1024, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hardwired IC chips. In other words, any processor-accessible media may be utilized to realize the storage media of the exemplary operating environment 1000.

Any number of program modules (or other units or sets of instructions/code) may be stored on hard disk 1016, magnetic disk 1020, optical disk 1024, ROM 1012, and/or RAM 1040, including by way of general example, an operating system 1028, one or more application programs 1030, other program modules 1032, and program data 1034.

A user may enter commands and/or information into computer 1002 via input devices such as a keyboard 1036 and a pointing device 1038 (e.g., a "mouse"). Other input devices 1040 (not shown specifically) may include a microphone, joystick, game pad, satellite dish, serial port, scanner, and/or the like. These and other input devices are connected to processing unit 1004 via input/output interfaces 1042 that are coupled to system bus 1008. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 1044 or other type of display device may also be connected to system bus 1008 via an interface, such as a video adapter 1046. Video adapter 1046 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1044, other output peripheral devices may include components such as speakers (not shown) and a printer 1048, which may be connected to computer 1002 via input/output interfaces 1042.

Computer 1002 may operate in a networked environment using logical connections to one or more remote computers, such as a remote computing device 1050. By way of example, remote computing device 1050 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1050 is illustrated as a portable computer that may include many or all of the elements and features described herein with respect to computer 1002.

Logical connections between computer 1002 and remote computer 1050 are depicted as a local area network (LAN) 1052 and a general wide area network (WAN) 1054. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 1002 is usually connected to LAN 1052 via a network interface or adapter 1056. When implemented in a WAN networking environment, computer 1002 typically includes a modem 1058 or other component for establishing communications over WAN 1054. Modem 1058, which may be internal or external to computer 1002, may be connected to system bus 1008 via input/output interfaces 1042 or any other appropriate mechanism(s). It is to be appreciated that the illustrated network connections are exemplary and that other manners for establishing communication link(s) between computers 1002 and 1050 may be employed.

In a networked environment, such as that illustrated with operating environment 1000, program modules or other instructions that are depicted relative to computer 1002, or portions thereof, may be fully or partially stored in a remote media storage device. By way of example, remote application programs 1060 reside on a memory component of remote computer 1050 but may be usable or otherwise accessible via computer 1002. Also, for purposes of illustration, application programs 1030 and other processor-executable instructions such as operating system 1028 are illustrated herein as discrete blocks, but it is recognized that such programs, components, and other instructions reside at various times in different storage components of computing device 1002 (and/or remote computing device 1050) and are executed by processor(s) 1004 of computer 1002 (and/or those of remote computing device 1050).

Exemplary Descriptions for BuildProviderHost and BuildProvider Classes

Two exemplary classes involved in a described architecture are: BuildProviderHost and BuildProvider. BuildProviderHost may be implemented, for example, by the ASP.NET build system from Microsoft® Corporation. BuildProvider may be implemented for each file type that plugs into the overall build system.

An exemplary description of a BuildProvider class follows an exemplary description of a BuildProviderHost class:

```
/// Provides services to BuildProvider's during their compilation
public abstract class BuildProviderHost {
    /// Returns a collection of assemblies that the build provider is to be compiled with.
    public abstract ICollection GetReferencedAssemblies( );
    /// Adds an assembly that is to be referenced during compilation.
    public abstract void AddAssemblyReference(Assembly a);
    /// Returns a CodeDomProvider that the build provider can use to generate a
    /// CodeCompileUnit.
    public abstract CodeDomProvider GetCodeDomProvider( );
    /// Creates a new source file that will be added to the compilation. The build
    /// provider writes source code to this file using the returned TextWriter.
    /// The build provider may close the TextWriter when it is done writing to it.
    /// The build provider passes itself as a parameter to this method.
    public abstract TextWriter CreateCodeFile(BuildProvider buildProvider);
```

-continued

```
/// Returns the physical path to a source file that will be included in the
/// compilation. Note that the file is not actually created. It is up to the
/// build provider to do this.
/// The source file has the correct extension for the target language.
/// The build provider passes itself as a parameter to this method.
public abstract string GetCodeFilePhysicalPath(BuildProvider buildProvider);
/// Adds a CodeCompileUnit to the compilation. This is typically used as an
/// alternative to CreateSourceFile, esp. by providers who are CodeDOM aware.
/// The build provider passes itself as a parameter to this method.
public abstract void AddCodeCompileUnit(BuildProvider buildProvider,
CodeCompileUnit codeCompileUnit);
    /// Creates a new resource that is to be added to the compilation. The build
    /// provider can write to it using the returned Stream.
    /// The build provider may close the Stream when it is done writing to it.
    /// The build provider passes itself as a parameter to this method.
    public abstract Stream CreateEmbeddedResource(BuildProvider buildProvider,
string name);
}
/// Base class for build providers that want to participate in a compilation.
/// It may be used by build providers that process files based on a virtual path.
public abstract class BuildProvider {
    /// Returns the language that this build provider uses, or null of it can use
    /// any language.
    public virtual string GetCodeLanguage( );
    /// Asks this build provider to generate any code that it has, using the various
    /// methods on the passed in BuildProviderHost.
    public virtual void GenerateCode(BuildProviderHost host);
    /// Gets or sets the virtual path that this build provider handles.
    public string VirtualPath { get; set; }
}
```

The above class descriptions are provided by way of example only, for software build extensibility may be implemented in a myriad of other manners as described herein. Additionally, although the above classes are implemented in the C# programming language, they may alternatively be implemented in one or more other languages. Furthermore, the above classes may be alternatively implemented in one or more non-Microsoft® Corporation environments.

Although systems, media, devices, methods, procedures, apparatuses, techniques, APIs, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more processor-accessible storage media comprising processor-executable instructions that, when executed, direct a device to perform file compilation actions, comprising:
   accepting a plurality of files, each file of the plurality of files corresponding to a respective file type and including source code, wherein at least two files have different file types;
   instantiating a plurality of build providers, wherein each of the plurality of build providers is exclusively associated with one file type;
   instantiating a single instance of a build provider host, wherein the build provider host includes a plurality of interfaces, wherein each of the plurality of interfaces is associated with one of the plurality of build providers during file compilation actions;
   calling a file path interface of each of the plurality of build providers, wherein a path to each associated file is received at the respective build providers from the build provider host;
   invoking a usable code language interface of each of the plurality of build providers, wherein each of the plurality of build providers provides a code language to be used during file compilation actions;
   sequentially calling a generate code interface of each build provider, wherein each build provider contributes at least a portion of the source code of the build provider's associated file to be compiled via one or more of:
      writing the source code to a code file object by calling a create code file object interface of the build provider host;
      writing the source code to a stipulated path by calling a get code file path interface of the build provider host; and
      generating a code compile unit by calling a get code object model provider interface and an add code compile unit interface of the build provider host;
   ascertaining one or more resources of each file of the plurality of files via the associated build provider;
   accessing a configuration file including a data structure that exclusively maps respective file types of the plurality of files to a respective build provider, wherein a new build provider is registered by updating the data structure of the configuration file to include a new entry that maps a new file type to the new build provider;
   launching a compiler to compile the source code and the one or more resources of each file of the plurality of files into a single target assembly; and
   using a build provider manager to control the plurality of build providers and the build provider host during file compilation actions.

2. The one or more processor-accessible storage media as recited in claim 1, wherein the plurality of interfaces of the build provider host further includes one or more of: a get referenced assemblies interface; an add assembly reference interface; and a create embedded resource interface.

3. The one or more processor-accessible storage media as recited in claim 2, wherein, upon execution: the get referenced assemblies returns a collection of one or more assemblies to be compiled; the add assembly reference adds at least one assembly to be referenced during compilation; the create code file object creates a file object that is to include a new source code for compilation; the get code file path returns a path to a file having source code to be included in compilation; the get code object model provider returns a code object model provider usable to generate a code compile unit; the add code compile unit enables one of the build providers to add another code compile unit to file compilation; and the create embedded resource creates a new resource to be added to file compilation.

4. The one or more processor-accessible storage media as recited in claim 1, wherein calling the file path interface of each build provider further comprises one of: calling a physical file path; and calling a virtual file path.

5. The one or more processor-accessible storage media as recited in claim 1, wherein each file type is specified by one of: an extension; a file naming scheme for an operating system; a file attribute; and a file tag.

6. The one or more processor-accessible storage media as recited in claim 1, further comprising: determining the code language for one of the plurality of files; returning the code language if the code language is determined; and returning a null if the code language is language agnostic.

7. The one or more processor-accessible storage media as recited in claim 1, wherein the source code of a respective file is one or more of: contiguous; discontinuous; including one or more modules; intermixed with other non-code portions; and directly or indirectly derived from non-code portions.

8. The one or more processor-accessible storage media as recited in claim 1, wherein generating a code compile unit by calling a get code object model provider interface and an add code compile unit interface of the build provider host further comprises generating the code compile unit as a language-independent structure.

9. The one or more processor-accessible storage media as recited in claim 1, wherein the action of compiling further comprises constructing at least one of: an object code file; an executable file; a dynamically linked library file; and an intermediate language file.

10. The one or more processor-accessible storage media as recited in claim 1, wherein ascertaining one or more resources of each file of the plurality of files via the associated build provider further comprises calling a create embedded resource interface of the build provider host.

11. The one or more processor-accessible storage media as recited in claim 1, wherein at least a portion of the processor-executable instructions comprise at least part of an operating system.

12. The one or more processor-accessible storage media as recited in claim 1, wherein at least a portion of the processor-executable instructions comprise at least part of a program that is capable of establishing a runtime environment.

* * * * *